US007179996B1

(12) United States Patent
Britt et al.

(10) Patent No.: US 7,179,996 B1

(45) Date of Patent: Feb. 20, 2007

(54) ELECTRICAL OUTLET SAFETY COVER ASSEMBLY

(76) Inventors: Dennis Webster Britt, 131 Champagne Rd., Gardner, MA (US) 01440; Thomas Edward Rahaim, 62 Maple St., Winchendon, MA (US) 01475

(*) Notice: Subject to any disclaimer, the term of this patent is extended or adjusted under 35 U.S.C. 154(b) by 0 days.

(21) Appl. No.: 11/322,112

(22) Filed: Dec. 29, 2005

(51) Int. Cl.
*H02G 3/14* (2006.01)

(52) U.S. Cl. .......................... 174/66; 174/67; 220/241

(58) Field of Classification Search .................. 174/66, 174/67; 220/241, 242; 312/328; D8/353; D13/177; 439/136
See application file for complete search history.

(56) References Cited

U.S. PATENT DOCUMENTS 2,526,606 A * 10/1950 Hendrick .................... 174/67
4,895,527 A 1/1990 Brown et al.
4,950,842 A 8/1990 Menninga
5,218,169 A * 6/1993 Riceman ...................... 174/67
5,594,208 A * 1/1997 Cancellieri et al. ........... 174/58

* cited by examiner

*Primary Examiner*—Dhiru R. Patel
(74) *Attorney, Agent, or Firm*—David O. Simmons

(57) ABSTRACT

A safety cover assembly for an electrical outlet comprises an outlet cover plate and a protective enclosure. The outlet cover plate includes a major face, an outlet receptacle opening within a central portion of the major face and a plurality of flexible retention arms extending forward of the major face. The protective enclosure is attached to the outlet cover plate. A plug receiving portion of the protective enclosure covers the central portion of the outlet cover plate. The protective enclosure includes a plurality of retention arm engagement structures. Each one of the flexible retention arms is disengagebly engaged with a respective one of the retention arm engagement structures for securing the protective enclosure in relative position with respect to the outlet cover plate. The protective enclosure includes an electrical cord recess within an edge wall of the protective enclosure.

17 Claims, 2 Drawing Sheets

ELECTRICAL OUTLET SAFETY COVER ASSEMBLY

FIELD OF THE DISCLOSURE

The disclosures made herein relate generally to electrical outlets and, more particularly, to protective devices and safety covers for electrical outlets.

BACKGROUND

It is a well known fact that children have been shocked by inserting metallic objects, such as nails, utensils, small pliers or the like, into receptacle openings of an electrical outlet. Electrical outlets located near the floor are particularly accessible to children. Various solutions have been conceived to address this potentially dangerous and deadly situation. One solution is to insert prongs of a plastic shield into receptacle openings of an electrical outlet, thereby preventing a child from touching or inserting objects into the receptacle openings. However, when an adult uses the electrical outlet, he or she has to remove the plastic shield, which is generally cumbersome, and remember to plug it back in. Furthermore, it is still possible that older children may be able to remove the plastic plug and insert objects into the receptacle openings. Another solution is includes replacing a conventional electrical outlet cover plate with an outlet cover assembly having a retractable plate over the receptacle openings. Insertion of a plug prongs into the receptacle openings requires that the retractable plate is first retracted to reveal the receptacle openings. While this solution ensures that forgetfulness will not lead to the receptacle opening being left unshielded after the plug is removed, such outlet cover assemblies generally include numerous moving pieces. Such a multiple-piece construction generally leads to increased complexity, reduced reliability and added to cost, which are all generally undesirable.

When in place, protective devices that cover the outlet openings of an electrical outlet are at relatively effective at preventing young children from inserting items into one or more of the receptacle openings. However, when a plug is engaged with the electrical outlet, a potential for electrical shock now exists at the prongs of the plug. Partial insertion of a plug often times leaves the prongs of the plug partially exposed even though the prongs are in electrical contact with the electrical outlet. Due to the small size of a child's hand, they can readily touch the prongs with a plug in this partially engaged orientation.

Therefore, a safety device for an electrical outlet that overcomes the abovementioned and other shortcomings associated with conventional solutions for reducing the potential for electrical shock at the receptacle openings of an electrical outlet would be useful and advantageous.

SUMMARY OF THE DISCLOSURE

Embodiments of the present invention conceal plugs engaged within an electrical outlet. In additional to reducing unsightliness of plugs engaged with an outlet, the present invention reduces the potential for a plug being unintentionally removed from an electrical outlet and reduces the hazard of a child or other person being shocked as a result of sticking a foreign object in the receptacle openings of the electrical outlet or as a result of touching the prongs of an electrical plug while it is plugged into the electrical outlet. More specifically, embodiments of the present invention provide a protective enclosure that, in use, is fixedly positioned over the receptacle openings even while an electrical plug is engaged with the receptacle openings. The protective enclosure includes a recess or passage through which an electrical cord is routed. The passage is positioned so as to limit the probability that an article can be inserted into the receptacle openings through the passage with the protective enclosure in place or that the plug can be removed with the protective enclosure in place. Accordingly, embodiments of the present invention advantageously overcome one or more shortcomings associated with conventional solutions for reducing the potential for electrical shock at the receptacle opening of an electrical outlet and concealing a plug engaged with an electrical outlet.

In one embodiment of the present invention, a safety cover system for an electrical outlet comprises an outlet cover plate and a protective enclosure. The outlet cover plate includes a major face, an outlet receptacle opening within a central portion of the major face and a plurality of retention members extending forward of the major face. The protective enclosure including a plurality of retention member engagement structures. Each one of the retention members is disengageably engageable with a respective one of the retention member engagement structures for securing the protective enclosure in relative position with respect to the outlet cover plate when the protective enclosure is in a use position with respect to the outlet cover plate.

In another embodiment of the present invention, a safety cover assembly for an electrical outlet comprises an outlet cover plate and a protective enclosure. The outlet cover plate includes a major face, an outlet receptacle opening within a central portion of the major face and a plurality of retention members extending forward of the major face. The protective enclosure is attached to the outlet cover plate. The protective enclosure includes a plurality of retention member engagement structures. Each one of the retention members is disengagebly engaged with a respective one of the retention member engagement structures for securing the protective enclosure in relative position with respect to the outlet cover plate.

In another embodiment of the present invention, a safety cover assembly for an electrical outlet comprises an outlet cover plate and a protective enclosure. The outlet cover plate includes a major face, an outlet receptacle opening within a central portion of the major face and a plurality of flexible retention arms extending forward of the major face. The protective enclosure is attached to the outlet cover plate. A plug receiving portion of the protective enclosure covers the central portion of the outlet cover plate. The protective enclosure includes a plurality of retention arm engagement structures. Each one of the flexible retention arms is disengagebly engaged with a respective one of the retention arm engagement structures for securing the protective enclosure in relative position with respect to the outlet cover plate. The protective enclosure includes an electrical cord recess within an edge wall of the protective enclosure.

Turning now to specific aspects of the present invention, in at least one embodiment, the major face of the outlet cover plate is rectangular shaped, two of the retention members are position in spaced apart relationship adjacent a first edge of the major face and at least one of the retention members is positioned adjacent a second edge of the major face opposite the first edge.

In at least one embodiment of the present invention, the two retention members adjacent the first edge of the major face each have a non-ramped retention portion and the at least one retention member adjacent the second edge of the major face has a ramped retention portion.

In at least one embodiment of the present invention, an open end of the protective enclosure has a generally rectangular cross sectional profile, two of the retention member engagement structures are position in spaced apart relationship within a first edge wall of the protective enclosure adjacent the open end, at least one of the retention member engagement structures is positioned adjacent a second edge wall of the protective enclosure adjacent the open end and the retention member engagement structures are positioned for enabling engagement by a respective one of the retention members when the protective enclosure is attached to the outlet cover plate.

In at least one embodiment of the present invention, the protective enclosure includes an electrical cord recess within an edge wall of the protective enclosure and the electrical cord recess is positioned between the two retention member engagement structures.

In at least one embodiment of the present invention, each one of the retention members extend into engagement with a respective one of the retention member engagement structures from within an interior space defined by the plug receiving portion of the protective enclosure.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
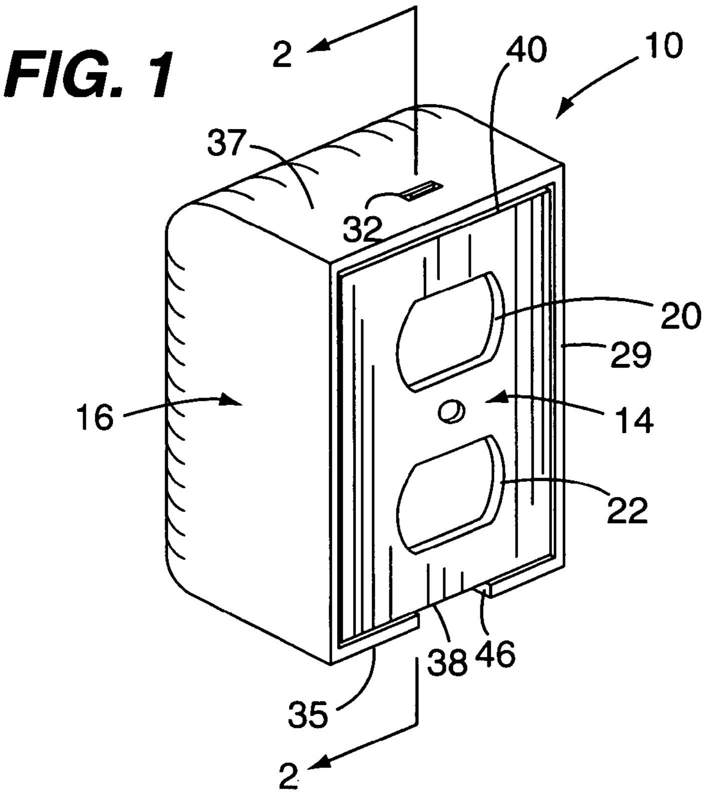
FIG. 1 is a rear perspective view of a safety cover assembly in accordance with the present invention.

FIGS. 1–4 depict an embodiment of a safety cover assembly in accordance with the present invention, which is referred to herein as the safety cover assembly 10. The safety cover assembly 10 includes an outlet cover plate 14 and a protective enclosure 16. The outlet cover plate 14 and a protective enclosure 16 can each be made from any number of different materials. Preferably, but not necessarily, the outlet cover plate 14 and a protective enclosure 16 are each made from a polymeric resin using a manufacturing process such as injection molding.

The outlet cover plate 14 includes a generally rectangular-shaped major face 18, a first outlet receptacle opening 20 within a central portion of the major face 18, a second outlet receptacle opening 22 within a central portion of the major face 18, a first flexible retention arm 24, a second flexible retention arm 26 and a third flexible retention arm 28. The first flexible retention arm 24, the second flexible retention arm 26 and the third flexible retention arm 28 each extending forward of the major face 18. The flexible retention arms (24, 26, 28), whose flexibility is provided by their material composition and/or physical configuration (e.g., length and thickness), are examples of retention members in accordance with the present invention. The present invention is not limited to flexible retention members (i.e., retention members in accordance with the present invention may be substantially rigid). Central portion is defined herein to mean the portion of the major face 18 that is bound by a perimeter of the major face 18 (i.e., there is material between edges of the outlet cover plate 14 and the outlet receptacle openings 20, 22)). Preferably, but not necessarily, the outlet cover plate 14 is configured for use with conventional (i.e., off-the-shelf) electrical outlets. As depicted, the outlet cover plate 14 includes two outlet receptacle openings (i.e., outlet receptacle openings 20, 22), thereby providing use with a dual receptacle electrical outlet. Optionally, the outlet cover plate 14 may include less than two outlet receptacle openings or more than two outlet receptacle openings.

Figure 2:
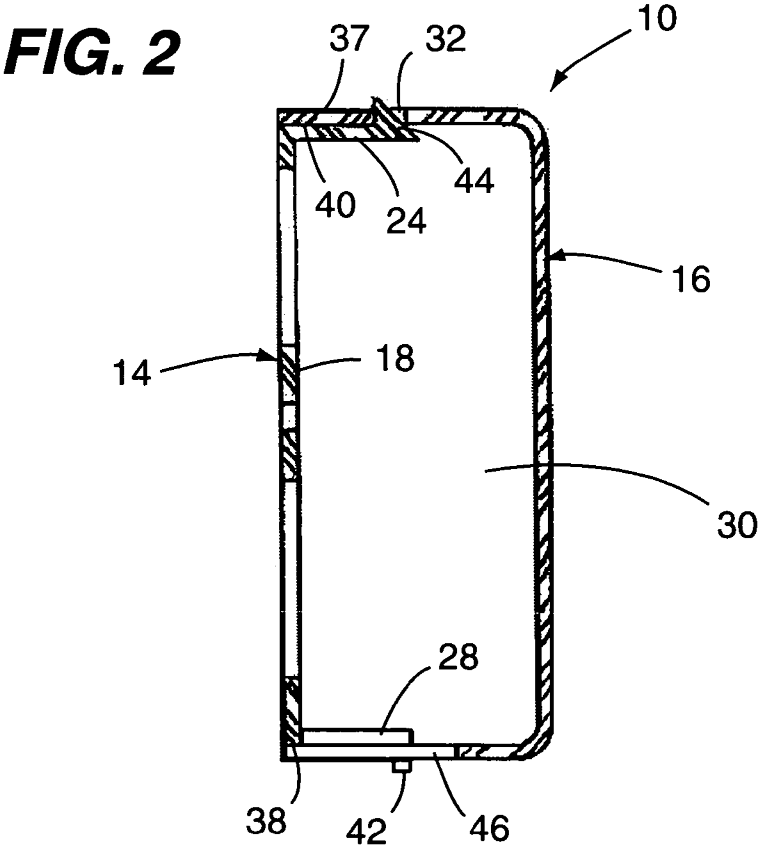
FIG. 2 is a cross-sectional view taken along the line 2—2 in FIG. 1.
Figure 3:
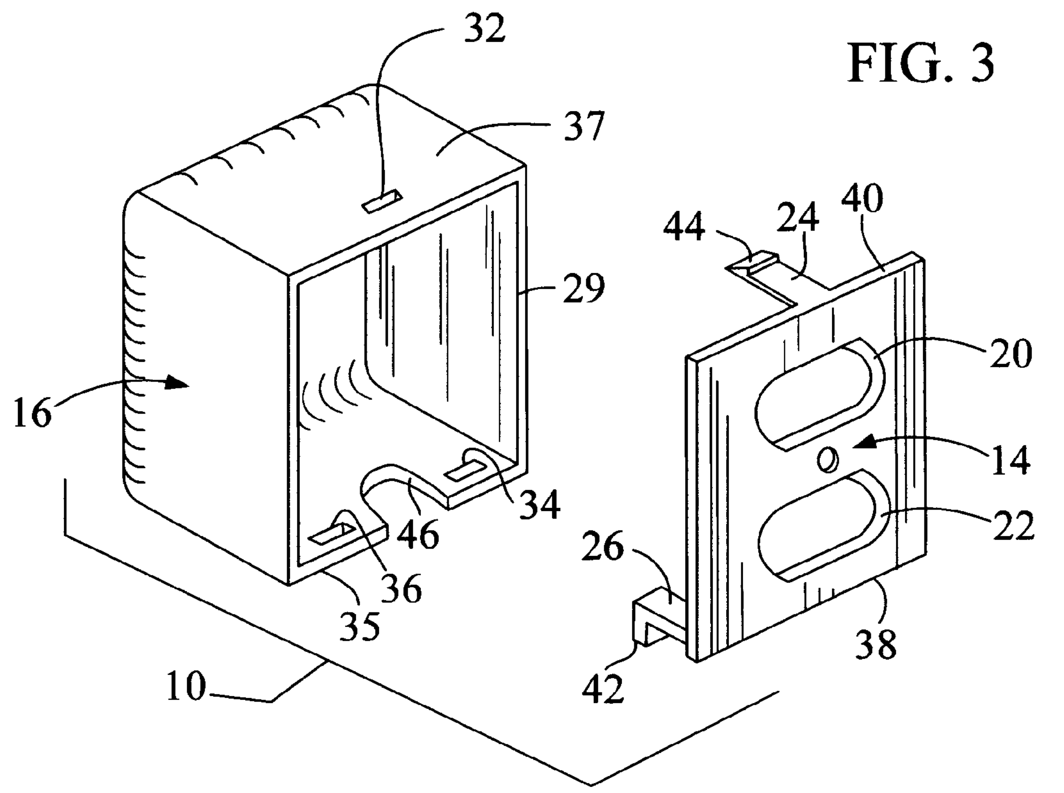
FIG. 3 is an exploded rear perspective view of the safety cover assembly of FIG. 1.

The protective enclosure 16 is attachable to the outlet cover plate 14. An open end 29 of the protective enclosure 16 has a generally rectangular cross sectional profile configured for having a perimeter edge of the outlet cover plate 14 flushly disposed therewith (e.g., positioned therein). As depicted in FIG. 2, when the protective enclosure 16 is attached to the outlet cover plate 14, a plug receiving portion 30 of the protective enclosure 16 covers the central portion of the outlet cover plate 14. A concave portion of the protective enclosure 16 that creates an interior space or cavity is an example of the plug receiving portion 30. Thus, the outlet receptacle openings (20, 22) of the outlet cover plate 14 are effectively covered by the plug receiving portion 30 of the protective enclosure 16.

The protective enclosure 16 includes a first retention arm engagement structure 32, a second retention arm engagement structure 34 and a third retention arm engagement structure 36. As depicted in FIGS. 1–4, a hole is a preferred embodiment of a retention arm engagement structure in accordance with the present invention. A detent, a recess and a ridge are other embodiments of a retention arm engagement structure in accordance with the present invention.

The second retention arm engagement structure 34 and the third retention arm engagement structure 36 are position in spaced apart relationship from each other within a first edge wall 35 of the protective enclosure 16 adjacent the open end 29 of the protective enclosure 16. The first retention arm engagement structure 32 is position within a second edge wall 37 of the protective enclosure 16 adjacent the open end 29 of the protective enclosure 16. The first edge wall 35 is opposite the second edge wall 37.

Each one of the flexible retention arms (24, 26, 28) is correspondingly positioned with a respective one of the retention arm engagement structures (32, 34, 36) such that each one of the flexible retention arms (24, 26, 28) is alignable with the respective one of the retention arm engagement structures (32, 34, 36) when the protective enclosure 16 is brought into engagement with the outlet cover plate 14. Each one of the flexible retention arms (24, 26, 28) is disengageably engagable (i.e., separable) with the respective one of the retention arm engagement structures (32, 34, 36) for enabling the protective enclosure 16 to be secured in relative position with respect to the outlet cover plate 14.

Figure 4:
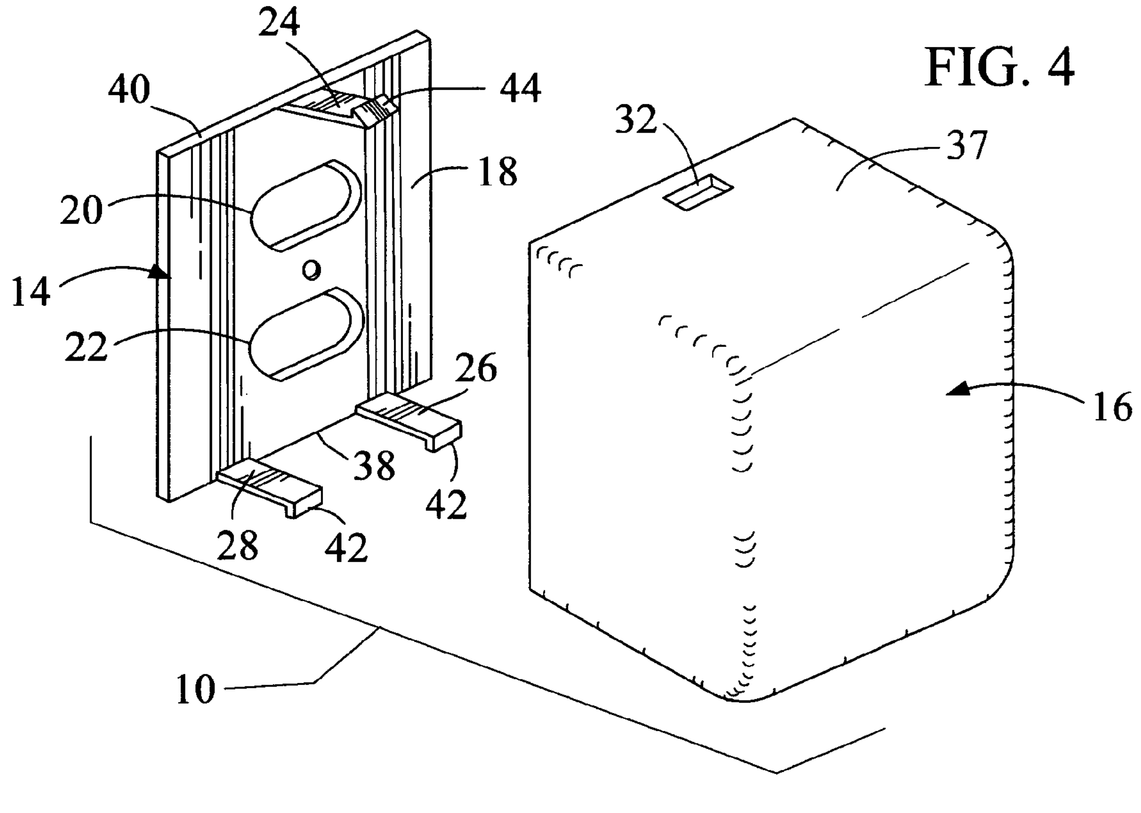
FIG. 4 is an exploded front perspective view of the safety cover assembly of FIG. 1.

The second flexible retention arm 26 and the third flexible retention arm 28 are positioned adjacent a first edge 38 of the major face 18. The first flexible retention arm 24 is positioned adjacent a second edge 40 of the major face 18. The first edge 38 is opposite the second edge 40. The second flexible retention arm 26 and the third flexible retention arm 28 each have a non-ramped retention portion 42. For example, as depicted in FIG. 4, the second flexible retention arm 26 and the third flexible retention arm 28 each have an L-shaped configuration. The first flexible retention arm 24 has a ramped retention portion 44. During attachment of the protective enclosure 16 to the outlet cover plate 14, the second flexible retention arm 26 and the third flexible retention arm 28 engaged with the respective retention arm engagement structures (34, 36). The protective cover 16 is then rotated about the second flexible retention arm 26 and the third flexible retention arm 28 until the first flexible retention arm 24 is engaged with the first retention arm engagement structure 32. During such rotation of the protective enclosure 16, the ramped retention portion 44 of the first flexible retention arm 24 engages the second edge wall 37 of the protective enclosure 16, thereby causing the first flexible retention arm 24 to flex sufficiently to pass under the second edge wall 37 of the protective enclosure 16 and allow the ramped retention portion 44 of the first flexible retention arm 24 to engage the first retention arm engagement structures 32.

The protective enclosure 16 includes an electrical cord recess 46 within the first edge wall 25. When the protective enclosure 16 is attached to the outlet cover plate 14, the electrical cord recess 46 of the protective enclosure 16 and the major face 18 of the outlet cover plate 14 jointly define an electrical cord passage through which an electrical cord of a device passes when a plug of the electrical cord is engaged with an electrical outlet on which the outlet cover plate 14 is mounted. Preferably, but not necessarily, the electrical cord recess 46 is positioned between the first retention arm engagement structure 34 and the second retention arm engagement structure 36. Optionally, the electrical cord recess 46 may be provided in an edge wall of the protective enclosure 16 other than the first edge wall 35 or the second edge wall 37.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A safety cover system for an electrical outlet, comprising:

an outlet cover plate including a major face, an outlet receptacle opening within a central portion of the major face and a plurality of flexible retention members extending forward of the major face, wherein two of said retention members are positioned in spaced apart relationship adjacent a first edge of the major face; and at least one of said retention members is positioned adjacent a second edge of the major face opposite the first edge; and a protective enclosure having an electrical cord recess within an edge wall of the protective enclosure, the enclosure including a plurality of retention member engagement structures, wherein each one of said retention members is disengageably engageable with a respective one of said retention member engagement structures for securing the protective enclosure in relative position with respect to the outlet cover plate when the protective enclosure is in a use position with respect to the outlet cover plate.

2. The safety cover system of claim 1 wherein:

the major face of the outlet cover plate is rectangular shaped.

3. The safety cover system of claim 2 wherein:

said two retention members adjacent the first edge of the major face each have a non-ramped retention portion; and said at least one retention member adjacent the second edge of the major face has a ramped retention portion.

4. The safety cover system of claim 2 wherein an open end of the protective enclosure has a generally rectangular cross sectional profile;

two of said retention member engagement structures are position in spaced apart relationship within a first edge wall of the protective enclosure adjacent the open end;

at least one of said retention member engagement structures is positioned adjacent a second edge wall of the protective enclosure adjacent the open end; and said retention member engagement structures are positioned for enabling engagement by a respective one of said retention members when the protective enclosure is in the use position.

5. The safety cover system of claim 4 wherein:

the protective enclosure includes an electrical cord recess within an edge wall of the protective enclosure; and the electrical cord recess is positioned between said two retention member engagement structures.

6. A safety cover assembly for an electrical outlet, comprising:

an outlet cover plate including a major face, an outlet receptacle opening within a central portion of the major face and a plurality of flexible retention members extending forward of the major face wherein two of said retention members are positioned in spaced apart relationship adjacent a first edge of the major face;

at least one of said retention members is positioned adjacent a second edge of the major face opposite the first edge; and a protective enclosure includes an electrical cord recess within an edge wall of the protective enclosure, the enclosure attached to the outlet cover plate, wherein the protective enclosure includes a plurality of retention member engagement structures and wherein each one of said retention members is disengagebly engaged with a respective one of said retention member engagement structures for securing the protective enclosure in relative position with respect to the outlet cover plate.

7. The safety cover assembly of claim 6 wherein:

the major face of the outlet cover plate is rectangular shaped.

8. The safety cover assembly of claim 7 wherein:

said two retention members adjacent the first edge of the major face each have a non-ramped retention portion; and said at least one retention member adjacent the second edge of the major face has a ramped retention portion.

9. The safety cover assembly of claim 7 wherein an open end of the protective enclosure has a generally rectangular cross sectional profile;

two of said retention member engagement structures are position in spaced apart relationship within a first edge wall of the protective enclosure adjacent the open end;

at least one of said retention member engagement structures is positioned adjacent a second edge wall of the protective enclosure adjacent the open end; and said retention member engagement structures are positioned for enabling engagement by a respective one of said retention members when the protective enclosure is attached to the outlet cover plate.

10. The safety cover assembly of claim 9 wherein:

the protective enclosure includes an electrical cord recess within an edge wall of the protective enclosure; and the electrical cord recess is positioned between said retention member engagement structures.

11. The safety cover assembly of claim 10 wherein each one of said retention members extend into engagement with a respective one of said retention member engagement structures from within an interior space defined by the plug receiving portion of the protective enclosure.

12. A safety cover assembly for an electrical outlet, comprising:

an outlet cover plate including a major face, an outlet receptacle opening within a central portion of the major face and a plurality of flexible retention arms extending forward of the major face wherein two of said flexible retention arms are positioned in spaced apart relationship adjacent a first edge of the major face;

at least one of said flexible retention arms is positioned adjacent a second edge of the major face opposite the first edge; and a protective enclosure attached to the outlet cover plate, wherein a plug receiving portion of the protective enclosure covers the central portion of the outlet cover plate, wherein the protective enclosure includes a plurality of retention arm engagement structures, wherein each one of said flexible retention arms is disengagebly engaged with a respective one of said retention arm engagement structures for securing the protective enclosure in relative position with respect to the outlet cover plate and wherein the protective enclosure includes an electrical cord recess within an edge wall of the protective enclosure.

13. The safety cover assembly of claim 12 wherein:

the major face of the outlet cover plate is rectangular shaped.

14. The safety cover assembly of claim 13 wherein:

said two flexible retention arms adjacent the first edge of the major face each have a non-ramped retention portion; and said at least one flexible retention arm adjacent the second edge of the major face has a ramped retention portion.

15. The safety cover assembly of claim 13 wherein an open end of the protective enclosure has a generally rectangular cross sectional profile;

two of said retention arm engagement structures are position in spaced apart relationship within a first edge wall of the protective enclosure adjacent the open end;

at least one of said retention member engagement structures is positioned adjacent a second edge wall of the protective enclosure adjacent the open end; and said retention member engagement structures are positioned for enabling engagement by a respective one of said retention members when the protective enclosure is attached to the outlet cover plate.

16. The safety cover assembly of claim 15 wherein the electrical cord recess is positioned between said two retention arm engagement structures.

17. The safety cover assembly of claim 16 wherein each one of said flexible retention members extend into engagement with a respective one of said retention arm engagement structures from within an interior space defined by the plug receiving portion of the protective enclosure.

* * * * *